United States Patent [19]

Makabe et al.

[11] 4,403,560

[45] Sep. 13, 1983

[54] ELECTRONIC SEWING MACHINE

[75] Inventors: Hachiro Makabe, Kanagawa; Akira Orii, Sagamihara; Yoshitaka Takahashi, Koganei, all of Japan

[73] Assignee: Janome Sewing Machine Co., Ltd., Tokyo, Japan

[21] Appl. No.: 289,521

[22] Filed: Aug. 3, 1981

[30] Foreign Application Priority Data

Aug. 8, 1980 [JP] Japan ................................ 55-108278

[51] Int. Cl.³ .............................................. D05B 3/02
[52] U.S. Cl. ................................................. 112/158 E
[58] Field of Search ........... 112/158 E, 121.11, 121.12

[56] References Cited

U.S. PATENT DOCUMENTS

| | | | |
|---|---|---|---|
| 4,142,473 | 3/1979 | Itoh | 112/158 E |
| 4,220,101 | 9/1980 | Nanai et al. | 112/158 E |
| 4,222,339 | 9/1980 | Iwako | 112/158 E |
| 4,282,821 | 8/1981 | Watanabe et al. | 112/158 E |
| 4,318,359 | 3/1982 | Takayama et al. | 112/158 E |

Primary Examiner—Peter P. Nerbun
Attorney, Agent, or Firm—Michael J. Striker

[57] ABSTRACT

Disclosed is an electronic sewing machine for modifying a stitch pattern with stitch forming instrumentalities, including a first memory for storing stitch control data used to control said stitch forming instrumentalities, a plurality of pattern selecting switches selectively operable for producing a different pattern signal for addressing the first memory to sequentially read the stitch control data, a second memory for storing a selected number of pattern signals, each one of the selected number of pattern signals designating an initial address of the first memory, a counter for counting the total and ordinal number of the pattern signals stored in the second memory, and a calculating device for storing at least one calculation formula for selecting a predetermined variation rate, the calculating device being responsive to the total as well as ordinal numbers of the pattern signals to modify the stitch control data read from the first memory for controlling the stitch forming instrumentalities.

1 Claim, 6 Drawing Figures

FIG_1
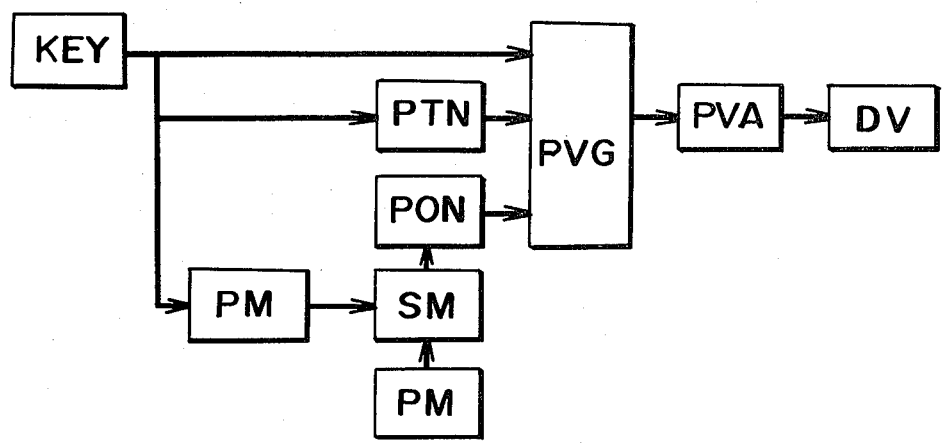
FIG_2(a)  FIG_2(b)  FIG_2(c)  FIG_2(d)
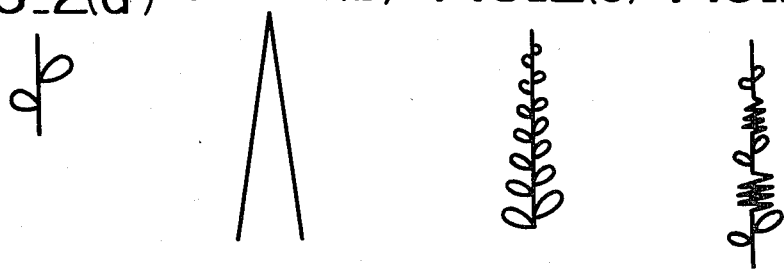

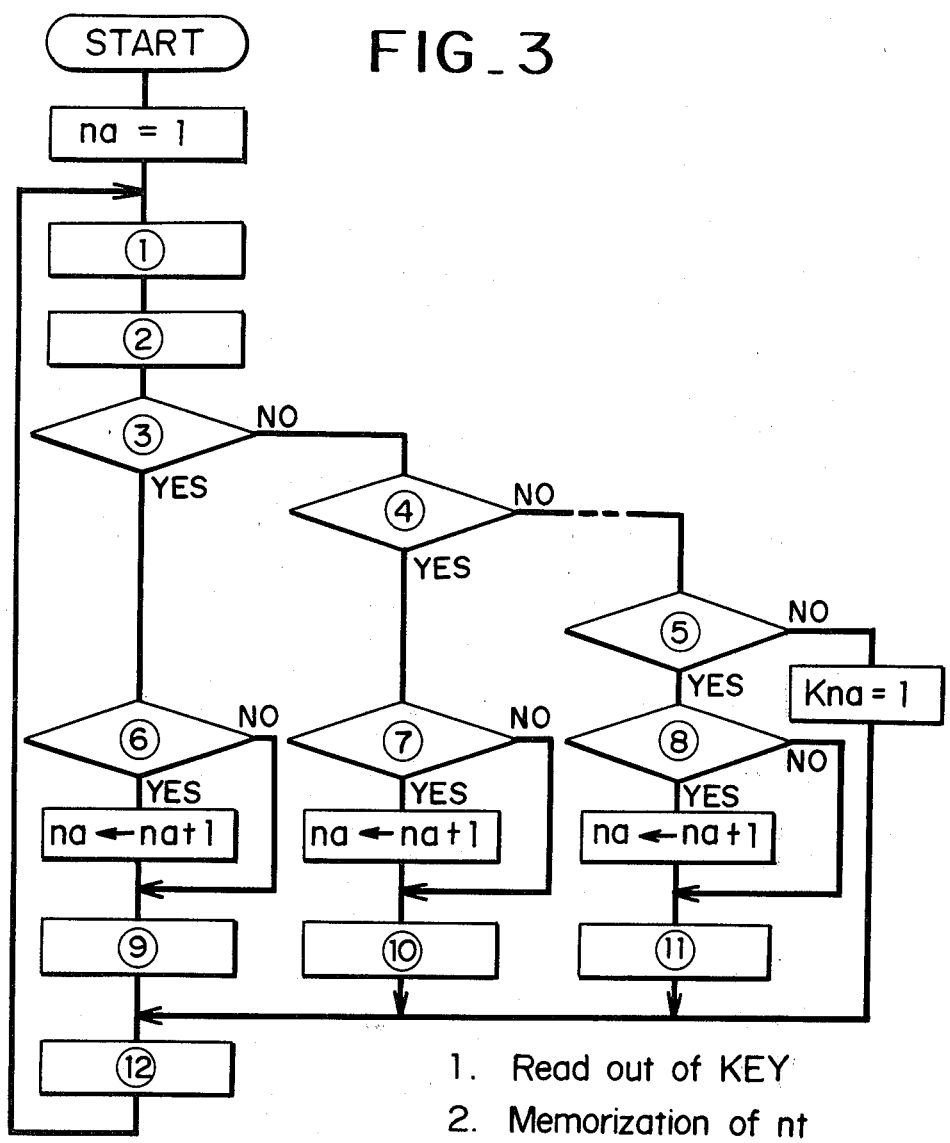
FIG_3
1. Read out of KEY
2. Memorization of nt
3. Variation No. 1
4. Variation No. 2
5. Variation No. N
6.7.8. End of one cycle
9. Variation No. 1 Calculation of Kna
10. Variation No. 2 Calculation of Kna
11. Variation No. N Calculation of Kna
12. Kna x SMdata

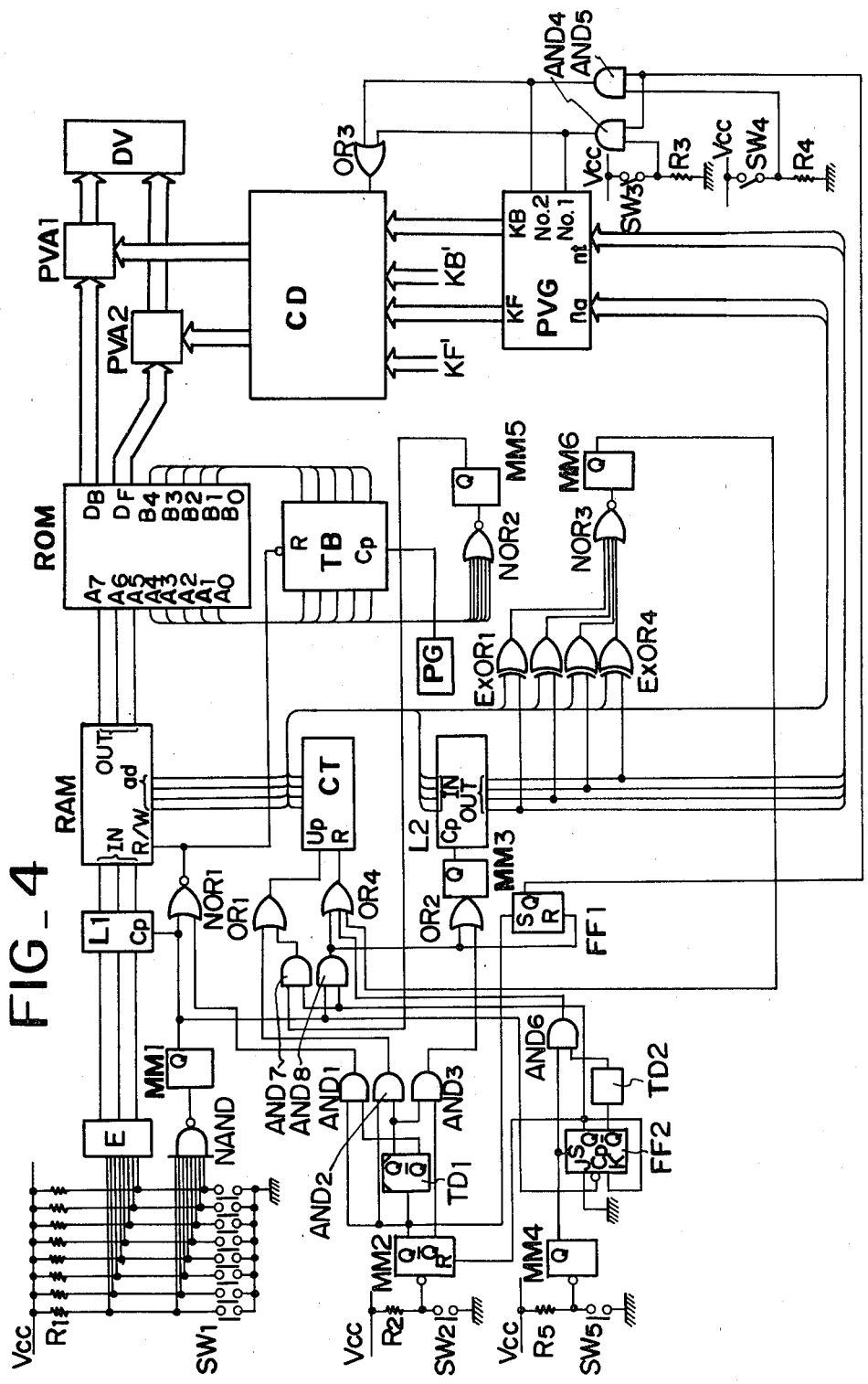
FIG_4

FIG_5
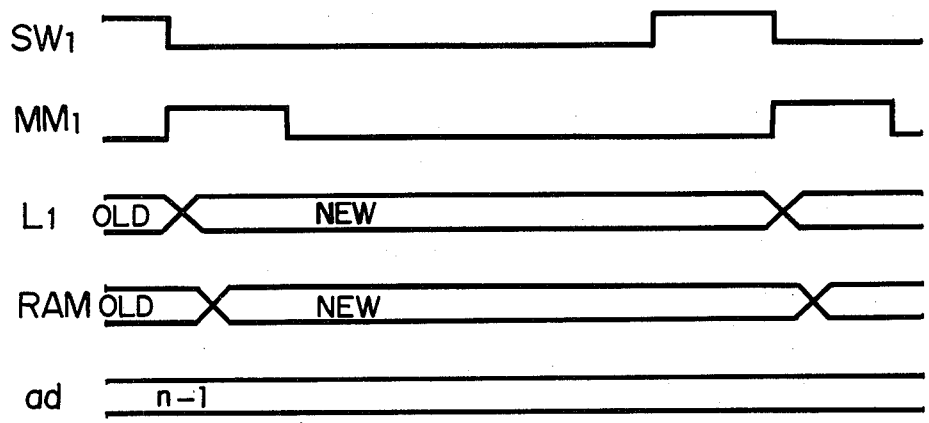
FIG_6
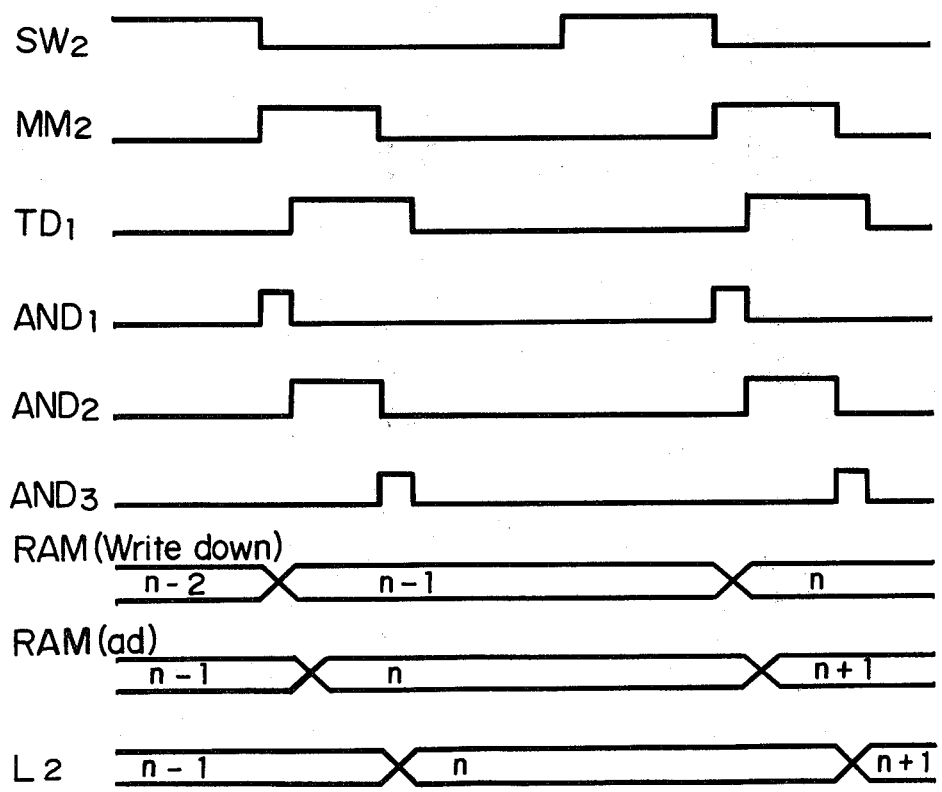

ELECTRONIC SEWING MACHINE

BACKGROUND OF THE INVENTION

The invention relates to an electronic sewing machine for electronically storing stitch control data which are sequentially read out with a timing pulse produced from a pulse generator operated in synchronism with rotation of an upper drive shaft of the sewing machine, to thereby control a stitch forming device. More particularly, the invention relates to a pattern varying device of the electronic sewing machine which is operated to control the transmission ratios between a data storing memory and the stitch forming device of the sewing machine as to vary the stitch width of a desired number of selected patterns with a predetermined variation rate for either progressively increasing or progressively reducing the stitch width of a series of such patterns.

According to the conventional electronic sewing machine, it is possible to vary or modify a pattern or a number of sequential patterns by manually adjusting a stitch width adjusting dial and a feed adjusting dial. However, such adjusting modes or values are determined during the production of the sewing machine at the factory, and therefore the variations or modifications of a pattern are limited. Moreover, when a number of sequential patterns is to be varied or modified with respect to a number of combined patterns, the machine operator is required to interrupt the running of the sewing machine each time one pattern is stitched so as to manually adjust the stitch width or feed amount for the next pattern. Such a manual operation is troublesome, and remarkably decreases the stitching efficiency.

SUMMARY OF THE INVENTION

An object of the present invention is to eliminate the aforesaid defects and disadvantages of the prior art sewing machines. To the achievement of this object, the sewing machine of the present invention substantially comprises: a number of pattern selecting switches selectively operated to produce a different pattern signal; a first electronic memory storing stitch control data for different patterns to be stitched; a pulse generator operated in synchronism with rotation of an upper drive shaft of the sewing machine to produce a timing pulse; addressing means operated in response to produce a timing pulse; addressing means operated in response to the timing pulse to address the first memory on the basis of the pattern signal so as to sequentially read the stitch control data from the memory for controlling a stitch forming device to produce a selected pattern of stitches; a second electronic memory for memorizing a selected number of pattern signals in a desired order for designating the initial address of the first memory; counter means operated to memorize the pattern signals in the second memory in a desired order and to indicate the total as well as the ordinal numbers of the pattern signals stored in the second memory; and calculating means for storing at least one predetermined calculating formula and being responsive to the total and the ordinal numbers of the pattern signals to modify the stitch control data by the calculating formula, to thereby control the operation of the stitch forming device with predetermined variation rates, wherein a desired number of patterns are successively produced with each pattern having a stitch width of a specific variation rate which results in a pattern as a whole having a progressively increasing or reducing variation rate.

BRIEF DESCRIPTION OF THE DRAWINGS

FIG. 1 shows a block diagram of a control circuit in accordance with the present invention;

FIG. 2 shows the patterns which are produced by the present invention;

FIG. 3 shows a control flow chart of the present invention;

FIG. 4 shows a control circuit of the present invention; and

FIGS. 5 and 6 each show a control time chart of the present invention.

DESCRIPTION OF PREFERRED EMBODIMENTS

Referring now to FIGS. 1-6 of the drawing, and more particularly to FIG. 1, there is shown a key board KEY including: pattern selecting switches selectively operated to produce a pattern data, a memory switch operated to store a number of patterns as a unit in an electronic memory, switches selectively operated to vary the unit of patterns, a machine controller switch operated to control the rotation speed of a machine drive motor, etc. PM is a memory for storing a number of the pattern data in a predetermined order as a unit of patterns. SM is another memory for storing stitch control data for different patterns, the initial addresses of which are each designated by the memory PM.

The memory SM is operated to produce a stitch control data each time it receives a timing pulse signal generated from a pulse generator which is operated in synchronism with the rotation of an upper drive shaft of the sewing machine, and to produce an end signal at the completion of each pattern. PON is a pattern order designating device for detecting the order of each pattern each time the memory SM produces the end signal and for holding the detected pattern order until the memory SM produces the next end signal. PVG is a pattern variation rate generating device for receiving a pattern variation rate designating signal from the key board KEY, the total number of memorized patterns from the pattern number storing memory PTN, and an ordinal of each pattern from the pattern order designating device PON.

The pattern variation generating device PVG is provided to vary the transmission ratio between the memory SM and a stitch forming device DV. The device PVG is operated in response to the pattern variation ratio designating signal to calculate the transmission ratio by means of a memorized calculation formula with a number of patterns to be a parameter and with the ordinal of each pattern to be variable. PVA is a multiplication device for receiving the stitch control data from the memory SM and the transmission ratio from the pattern variation rate generating device PVG, and multiplying the stitch control data by the transmission ratio and transmitting the output to the stitch forming device DV. Thus, the stitch forming device DV is operated to produce a pattern by a modified stitch control data, to thereby vary the size of each pattern of the sequential patterns.

FIG. 2 shows examples of the patterns which are produced by the invention. FIG. 2(a) is a unit pattern produced by the original data stored in the memory SM via a laterally swingable needle, while a fabric is vertically transported with a constant feeding pitch. FIG.

2(b) is a diagrammatic representation of calculation formula stored in the pattern variation rate generating device PVG for defining the maximum width of stitches for the respective patterns. The calculation formula is selected at the key board KEY. FIG. 2(c) shows another unit pattern of the same patterns comprising the pattern shown in FIG 2(a) which is produced by application of the calculation formula shown in FIG. 2(b). FIG. 2(d) shows yet another unit pattern comprising different patterns which is also produced by application of the aforesaid calculation formula, each pattern comprising substantially the same number of stitches.

FIG. 3 is a flow chart of the block diagram of the control circuit shown in FIG. 1. When a control power source is applied, the program is started from the START. The pattern progress number (na) is initially set to 1 by the pattern order designating device PON. The key board KEY is read, and a desired number of patterns (nt) is stored in the pattern number storing memory PTN. If the pattern variation mode No. 1 is designated from the pattern variation modes N, the end of the initial component pattern (completion of one cycle) is discriminated. This discrimination depends upon if the pattern order designating device PON receives the end signal from the stitch control data storing memory SM. If the initial pattern is not yet finished, the pattern variation rate generating device PVG calculates the variation rate of the initial pattern.

In this case, the pattern variation mode is number 1 as shown in FIG. 2(b). The variation rate calculation formula is $KNA = NA/NT$, provided the maximum width of the pattern (maximum width of the pattern in FIG. 2(b) is 1, the total number of the patterns is NT, the pattern progress number is NA, and the variation rate of each pattern is KNA. Therefore, if NA is 7, $KNA = 1/7$ is the variation rate of the initial pattern in accordance with the pattern in FIG. 2(c). Then, the multiplication device TVA multiples the switch control data of the memory SM by the pattern variation rate with respect to the initial pattern to be stitched, to thereby reduce the original control data into 1/7 with respect to the stitch width of the initial pattern. The program repeats the progress from data read by KEY until the pattern is stitched up. Upon completion of the initial pattern, the progress number NA is added with number 1 to form a new NA, and the second pattern is which is not shown in FIG. 3, stitched in the same manner. When NA comes to NT the next pattern is NA+1. Thus, a series of patterns is repeatedly stitched. If the pattern selection is not accompanied by the pattern variation rate designation numbers 1 or 2, the variation rate KNA is 1 and the selected pattern or patterns are produced in accordance with the original stitch control data of the memory SM. In reference to FIG. 4, which shows a control circuit represented by the block diagram of FIG. 1, SW1 denotes a number of pattern selecting switches which form a part of the keyboard KEY in FIG. 1 and selectively operated to cause an encoder E to produce a 3-BIT code signal of a selected pattern to a latch circuit L1. Vcc is a positive control power source. R1 denotes a number of pull-up resistors. MM1 is a monostable multivibrator circuit for receiving a signal from the pattern selecting switches SW1 through a NAND circuit and having an output terminal Q for giving the signal to the trigger terminal Cp of the latch circuit L1, so that the latch circuit Li may latch the code signal of a selected pattern. RAM is an electronic random-access memory, corresponding to the pattern comprising memory PM in FIG. 1, and having an input IN for receiving the data from the latch circuit L1, an address input (ad) for designating a memory column for the received data, a mode terminal R/W for designating the writing of the data in the designated memory column, and an output OUT for producing the data in accordance to the read-out designation of the mode terminal R/W.

ROM is an electronic read-only memory, corresponding to the stitch control data storing memory SM in FIG. 1, for storing the stitch control data of various patterns to be stitched. The memory ROM has address input terminals A0-A7, of which the terminals A5-A7 receive the encoded signal, which is selected at the pattern selecting switches SW1, directly or indirectly from the output OUT of the memory RAM. S2 is a selected pattern memorizing switch forming a part of the key board KEY. The switch S2 is operated to produce a low level signal to operate a monostable multivibrator circuit MM2, which has a true side output terminal Q connected to the input of a delay circuit TD1.

An AND circuit AND1 receives the true side output Q of the monostable multivibrator circuit MM2 and the complement side output Q of the delay circuit TD1, and has an output connected to the input side of a NOR circuit NOR1. R2 is a pull-up resistor. The NOR circuit NOR1 receives the output Q of the monostable multivibrator circuit MM1 and has an output connected to the mode terminal R/W of the memory RAM, so that the output of the latch circuit L1 may be written or rewritten in the memory RAM each time the switch SW1 or SW2 is operated. Namely, when the switch SW1 or SW2 is not operated, the terminal R/W is maintained at a high level for normally giving the data read-out order. On the other hand, each time the switch SW1 or SW2 is operated, the terminal R/W becomes temporarily a low level giving the data write-down order. After a counter CT advances the address of the memory RAM by operation of the switch SW2, the data from the latch circuit L1 is written in the new addresses of the memory RAM by operation of switch SW1. If switch SW1 is repeatedly and solely operated without operation of the switch SW2, the data is rewritten each time a different switch SW1 is operated.

The counter CT corresponds to the pattern order designating device PON in FIG. 1, and is reset when the control power source is applied. The counter CT has a count-up terminal Up connected to the true side output terminals Q of the monostable multivibrator circuit MM2 and connected to the delay circuit TD through an AND circuit AND2 and an OR circuit OR1, and for counting subsequent to the operation of the switch SW2. A latch circuit L2 corresponds to the pattern number storing memory PTN in FIG. 1, and has an input IN for receiving the counting signal of the counter CT and has an output OUT connected to the pattern number input terminal (nt) of the pattern variation rate generating device PVG which has a pattern progress input (na) connected to the output OUT of the counter CT.

The latch circuit L2 has a trigger terminal Cp connected to the selected pattern memorizing switch SW2 through an AND circuit AND3 for receiving the complement side output Q of the monostable multivibrator circuit MM2 and connected to the true side output Q of the delay circuit TD1 through an OR circuit OR2 and a monostable multivibrator circuit MM3, so as to latch the counting up signals of the counter CT which is operated by operation of the switch SW2. SW3 aand SW4 are pattern variation mode designating switches, each comprising a part of the key board KEY in FIG. 1. Such switches may be employed in number as shown by "N" number of switches in FIG. 3. R3, R4 and R5 are pull-up resistors.

AND circuits AND4, AND5 each have one input terminal which are a high level when the switches SW3 and SW4 are operated, respectively, and each have another input terminal connected to the output Q of a flip-flop circuit FF1, which is set by the operation of the monostable multivibrator circuit MM2 when the pattern number memorizing switch SW2 is operated. Circuits AND4, AND5 each have an output terminal connected to the pattern variation mode designating inputs No. 1, No. 2, respectively, of the pattern variation rate generating device PVG, and are made effective when the switches SW3, SW4 are operated after the switch SW2 is operated. TB is a timing buffer having a reset terminal R connected to the output of the NOR circuit NOR1. Each time the switches SW1, SW2 are operated, the output of the timing buffer TB becomes 0, to thereby make 0 the address input terminals A0–A4 of the memory ROM connected to the output of the timing buffer TB. The timing buffer TB has a trigger terminal Cp connected to a pulse generator PG which is operated in synchronism with the rotation of the upper drive shaft of sewing machine (not shown herein) to produce a timing pulse per rotation of the upper drive shaft. Thus the timing buffer TB latches the address signals B0–B4 of the memory ROM to advance the address of the memory per rotation of the upper drive shaft. The relation between the memory ROM and the timing buffer TB is described in detail in U.S. Pat. No. 4,086,862 of the same applicant and which is incorporated herein by reference.

The memory ROM has a needle control signal output $D_B$ and a feed control signal output $D_F$ connected to the input sides of the multiplication devices PVA1, PVA2, respectively. PVA1, PVA2 have other input sides for receiving, through a switching device CD, the needle swing variation rate KB and the feed variation rate KF, respectively, produced by the pattern variation rate generating device PVG, to the calculations $DB \times KB$ and $DF \times KF$. The resulting output of PVA1, PVA2 are applied to the stitch forming device DV. The switching device receives the stitch adjusting signals KB' and KF' besides the needle and feed variation rate signals KB, KF, which are separately controlled by the conventional stitch adjusting device, and is selectively operated by the signal from an OR circuit OR3, which receives the outputs from the AND circuits AND4, AND5, to make selectively effective the signals KB, KF and the signals $K_B'$, $K_F'$. When the switches SW3, SW4 are closed, i.e. when a varied combination of patterns is selected, the signals KB, KF are made effective. On the other hand, when the switches SW3, SW4 are opened, i.e. when the normal pattern stitching is selected, the signals $X_B'$, $K_F'$ are made effective.

SW5 is a controller switch comprising a part of the key board KEY, and is closed when a machine motor speed control controller is operated. The controller switch SW5 is operated to produce a low level signal to actuate a monostable multivibrator circuit MM4. Then the monostable multivibrator circuit MM4 gives the true side output Q to the set terminal S of a flip-flop circuit FF2 to set the latter. The flip-flop circuit FF2 has a terminal J grounded to be a low level, a terminal K connected to the true side output terminal Q thereof and a trigger terminal CP is connected to the output terminal Q of the monostable multivibrator circuit MM1, so that the flip-flop FF2 may be reset by the low level signal of the monostable multivibrator circuit MM1.

The counter CT has a reset terminal R connected, through an OR circuit OR4, to the output of a delay circuit TD2 which is operated by the complement side output of the flip-flop circuit FF2, and is connected to the output of an AND circuit AND6 having its input connected to the output Q of the monostable multivibrator circuit MM$. The counter CT is reset when the controller switch SW5 is operated after the pattern selecting switch SW1 is operated. The true side output Q of the flip-flop circuit FF2 is connected to the reset terminal R of the monostable multivibrator circuit MM2, and to one input terminal of AND circuit AND7 and of AND circuit AND8.

The address signal A0–A4 of the memory ROM provides 0 for the initial stitch, and then the monostable multivibrator circuit MM5 is operated through the NOR circuit NOR2. The AND circuit AND7 has another input connected to the output Q of the monostable multivibrator circuit MM5, and has the output connected to the count-up terminal Up of the counter CT through an OR circuit OR1, so that the counter CT may advance the count each time a new unit of patterns starts to be stitched. The AND circuit AND8 has another input connected to the output Q of the monostable multivibrator MM1 so as to reset the counter CT through the OR circuit OR4 when the pattern selecting switch SW1 is operated after the controller switch SW5 is operated. At the same time, the latch circuit L2 latches the value 0 of the counter CT through the OR circuit OR2 and the monostable multivibrator circuit MM3, and the flip-flop circuit FF1 is reset.

Exclusive OR circuits ExOR1–ExOR4 compare the output signal of the counter CT and the output signal of the latch circuit L1 with respect to the bits of these output signals. If all the bits of the output signals are in accord with each other, the exclusive OR circuits operate a monostable multivibrator circuit MM6 through a NOR circuit NOR3. The output Q of the monostable multivibrator circuit MM6 resets the counter CT through the OR circuit OR4, to thereby make 0 the pattern number progressing input terminal (na) of the pattern variation rate generating device PVG, so as to meet the initial stitch of a combination of patterns.

Referring particularly to FIGS. 5 and 6, the operation of the control circuit will now be explained; if one of the pattern selecting switches SW1 is pushed, a low level signal is produced to operate the monostable multivibrator circuit MM1. Then the latch circuit L1 latches a new data NEW in place of the old data OLD, and the memory RAM is written with the new data NEW in place of the old data OLD. At this time, the address input (ad) is n−1. With the operation of the pattern selecting switch SW1, the flip-flop FF2 is reset, and the AND circuit AND8 nullifies the signal of the pattern selecting switch SW1. The counter CT is therefore not reset and receives no counted input.

Then if the selected pattern number memorizing switch SW2 is pushed to store the selected pattern so as to form a series of patterns, a low level signal is produced to operate the monostable multivibrator circuit MM2 which will then produce a pulse signal. Subsequently, the delay circuit TD1 is operated to produce a pulse of the same width as the pulse width of the monostable multivibrator MM2. With the production of the pulses, the AND circuits AND1, AND2, AND3 produce a pulse one after another as is shown in FIG. 6. With the high level signal of the AND circuit AND1, the mode terminal R/W of the memory RAM becomes a low level, and the same data is memorized again at a column designated by the address n−1. With the subsequent high level signal of the AND circuit AND2, the counter CT is operated to count up and the address (ad) becomes (n). With the subsequent high level signal of the AND circuit AND3, the latch circuit L2 latches the output data (n) of the counter CT. Thus, each time the switch SW2 is operated, the AND circuits AND1, AND2, AND3 are operated to write the data in the memory RAM, advance the address (ad), and latch the same data in the latch circuit L2. Thus, a desired number of the same patterns are stored in the latch circuit L2. If another one of the pattern selecting switches SW1 is pushed after the pattern number memorizing switch SW2 is pushed, a series of different patterns are memorized.

Then if the pattern variation designating switch SW3 or SW4 is pushed, the pattern variation No. 1 or No. 2 is designated to the pattern variation rate generating device PVG because the flip-flop circuit FF1 is already set. The switching device CD is then operated to transmit to the multiplication devices PVA1, PVA2, the needle swing variation rate signal $K_B$ and the feed variation rate signal $K_F$, respectively, of the pattern variation rate generating device PVG. Then if the controller not herein shown is operated to close the switch SW5, the flip-flop circuit FF2 is set, the counter CT is reset and the address (ad) becomes 0. This address corresponds to the initial address of the stitch control data of the pattern selected by the switch SW1, namely the address n−1 in FIG. 6.

The sewing machine needle is brought to the initial stitching position of the pattern by the stitch forming device DV which is operated by the product KB DB, KF DF of the output data DB, DF and the output data KB, KF. In this case, the data DB, DF are read from the memory ROM with the condition that the address signals A7-A5 of A7-A0 are designated to the initial address of the stitch control data and the other address are 0. This corresponds to na=1 in FIG. 3 representing the stitching progress of pattern. In this case, the pattern variation rate Kna corresponds to the needle swing variation rate KB. It is also possible to apply the same calculating formula to the feed variation rate KF.

As the upper drive shaft of the sewing machine is rotated, the pulse generator PG produces a timing pulse. With the first timing pulse, the memory ROM is initially addressed and produces the stitch control data $D_B$, $D_F$, and at the same time produces the addressing data B4-B0 which is latched in the timing buffer TB and is applied to the address inputs A4-A0 for reading out the next stitch control data $D_B$, $D_F$. In this manner, the pattern stitches are formed as the upper drive shaft is rotated. When the data $D_B$, $D_F$ is produced for the last stitch of the initial pattern of the sequential patterns, the simultaneous addressing data B4-B0 is 0. Then the counter CT starts to count up to designate the initial address of the second pattern. In this manner, a number of patterns are produced one after another until the last pattern is finished up. If the counter CT counts up the last number of the patterns which are stored in the latch circuit L2, the monostable multivibrator circuit MM6 is operated to reset the counter CT, which will then designate the initial address of the initial pattern of the sequential patterns. Thus, a memorized number of sequential patterns are repeatedly produced.

If the pattern selection is implemented with the pattern selecting switches SW1 and the memorizing switch S2, and without operation of the pattern variation rate designating switch SW3 or SW4, the switch adjusting signals KB', KF', which are variable by operation of the normal stitch adjusting dials, are made effective in place of the needle swing variation rate signal KB and the feed variation rate signal KF. If the pattern selection is implemented without operation of the pattern memorizing switch SW2, the counter receives no input and therefore a pattern selected by the switch SW1 is repeatedly produced.

While the invention has been illustrated and described as embodied in an electric sewing machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an electronic sewing machine having stitch forming instrumentalities including a feed regulating device for feeding a fabric to be sewn and a needle regulating device with a needle vertically reciprocated and laterally swingable transversely of the fabric feeding direction, and an electronic circuit device for controlling the stitch forming instrumentalities for producing and modifying a series of stitch patterns, the electronic circuit device comprising:

first memory means (ROM) for storing stitch control data for producing various stitch patterns;

pattern selecting means (KEY) connected to said first memory means and including a plurality of pattern selecting switches ($SW_1$) each selectively operated to produce a pattern datum designating a specific one of the stitch control data stored in the first memory means (ROM);

pattern disposing means connected to said pattern selecting means and including a second memory (RAM) for storing a series of pattern data produced by the pattern selecting switches in a predetermined order for sequentially addressing the first memory means to read out therefrom the stitch control data, a function switch ($SW_2$) operated each time after any of the pattern selecting switches are operated, to thereby produce a signal for causing the second memory to write down therein the pattern data of the pattern selecting switches, a counter (CT) operated upon receipt of the signal from the function switch to count in the second memory in a predetermined order the pattern data produced by the pattern selected switches and to generate count-up signals, and a third memory ($L_2$) operated upon receipt of the signal from the function switch to store therein the count-up signals of the counter;

pattern variation rate generating means (PVG) connected to said counter and containing a calculating formula and receiving the output of the counter representing the order of patterns and the output of the third memory representing the total number of patterns, to produce an output as a result of calculation with the calculating formula and the outputs of the counter and the third memory;

mode switching means connected to said pattern variation rate generating means and including at least one switch operated to influence the pattern variation rate generating means to determine a variation rate of the selected series of patterns; and calculating means connected to said first memory means and to said pattern variation rate and operated for receiving the stitch control data produced from the first memory means and the pattern variation rate produced from the pattern variation rate generating means to produce an output signal as a result of calculation with the stitch control data and the pattern variation rate to be applied to a stitch forming device.

* * * * *